United States Patent Office 3,373,129
Patented Mar. 12, 1968

3,373,129
METHOD FOR THE PRODUCTION OF FORMABLE RESIN MATERIALS OF INCREASED VISCOSITY
Shoichiro Kori, 2147 Higashiterao, Tsurumi-ku; Yasuo Sagane, 62 Kuritaya, Kanagawa-ku; and Keitaro Inoue, 2441 Kawashima-cho Hodogaya-ku, all of Yokohama, Japan
No Drawing. Continuation-in-part of application Ser. No. 420,120, Dec. 21, 1964. This application June 9, 1967, Ser. No. 644,794
Claims priority, application Japan, Dec. 25, 1963, 38/69,464; May 26, 1964, 39/29,395
7 Claims. (Cl. 260—29.6)

ABSTRACT OF THE DISCLOSURE

Unsaturated polyester resin is mixed with an aluminum alkoxide compound capable of increasing the viscosity of said resin and a free water-supplying material. The free water content of the resulting mixture is maintained during the mixture below 0.75 mol per mol of said aluminum alkoxide compound, and when heated, the mixture releases free water from said free water-supplying material to raise a total free water content of the mixture to the order between above 0.75 to about 4.0 mol per mol of said aluminum alkoxide compound, thereby the viscosity of the mixture being increased and controlled appropriately.

---

This application is a continuation-in-part of the co-pending patent application Ser. No. 420,120, filed Dec. 21, 1964, and now abandoned.

The present invention relates to a method for the production of formable resin materials.

The principal object of the present invention is to facilitate the control of the viscosity of formable or moldable resin material during production thereof.

Another object of the present invention is to provide formable resin materials of high viscosity but tack free to hands, capable of forming in various shapes and being reinforced or unreinforced with fibers.

A further object of the present invention is to provide formable resin materials which are capable of preserving for a long period of time and not flowing during forming and curing.

Still another object of the present invention is to provide an extremely long, continuous, formable resin materials in rolled or folded form.

Other objects and advantageous features of the present invention will be apparent from the following description.

Synthetic resins are used for the production of various kinds of articles. The synthetic resins are, according to their applications, either mixed or not mixed with fillers or coloring materials. Besides, a curing agent, accelerator, catalyst and inhibitor are added depending on the kind of the resins used.

The above-mentioned mixtures comprising synthetic resins as well as one or more of fillers, coloring materials, curing agents, accelerators and inhibitors (hereinafter referred to as resins mixtures or merely as resins) are, according to their applications, either reinforced or not reinforced with fibrous materials and are known in various types, such as premix compounds, pellets or band-like forms.

Formable materials obtained by impregnating the reinforcing materials with resin mixtures and increasing the viscosity of the resins to a degree of being tack free to hands, are known as "prepreg," among which the most widely used one is glass fiber-reinforced prepreg.

The present invention will be chiefly explained with respect to the glass fiber-reinforced prepreg. However, the present invention involves formable materials which are reinforced with reinforcing materials other than glass fibers, or formable materials containing no reinforcing material.

When reinforcing material such as glass fiber or the like is impregnated with resins or resin mixtures, the viscosity of the resins is required to be kept low and definite. If the viscosity of the resin is high, the resin will have difficulty in penetrating into the interior of the reinforcing material. Accordingly, in the interior of the reinforcing materials, portions where no resin is present or portions low in the content of resins are liable to occur. Therefore, the formable material becomes inhomogeneous. This tendency is especially noticeable, when the reinforcing material is in fibrous and thick, rolled or folded state. When the viscosity of the resins varies, the velocity of the resin penetrating into the reinforcing material will also vary. Accordingly, the variation of the viscosity of the resin will cause variation of the content of resin. As a result, it will then be hard to obtain formable material of constant quality.

As methods of producing prepreg formable materials, a heating method and an evaporation method are known.

The heating method is a method wherein high viscosity resins are used and then heated to lower their viscosity in order to cause the resins to penetrate into the reinforcing material. In order to lower the viscosity, the resin is heated at as high a temperature as possible. However, the higher the heating temperature of the resin, the more readily the viscosity of the resins increases during heating owing to curing. It will be apparent from the foregoing descriptions that homogeneous and constant quality prepreg formable materials can not be obtained by the heating method.

The evaporation method is a method wherein high viscosity resins are dissolved in a solvent to lower their viscosity and the solvent is evaporated after said solution has been penetrated into the reinforcing materials. The evaporation method is effective for obtaining prepreg formable materials, but is not economical. It requires high expenses for the installation of solvent recovery equipments; moreover, it is difficult to recover the solvent completely and the loss of the solvent is large.

In the evaporation method, it is difficult to obtain homogeneous prepreg formable materials, when the reinforcing materials are fibrous and thick, folded or rolled. The reason is as follows: The solvent evaporates from the surface of the reinforcing materials and the viscosity of the resins increases with the evaporation. The evaporation of the solvent from the interior is then prevented by the high viscosity resins thus formed near the surface, and in the interior, a considerable amount of solvent remains. For this reason, the viscosity of the resins in the interior does not become as high as near the surface. Further, the solvent remained in the interior evaporates at the curing step and cause various troubles such as the formation of cavities.

Prepreg formable materials can also be obtained by using metal alkoxides. This method is called metal alkoxide method. In this method, as compared with the above two methods, resin of lower viscosity is used, said resin being mixed with metal alkoxide. Reinforcing material is impregnated with a mixture of the resin and the metal alkoxide and then heated. The viscosity of the resin rises quickly by heating, and the prepreg formable material is obtained.

This method is an extremely hopeful method. However, on account of the following disadvantage, industrial application of this method was difficult. The influence of the fluctuation in quality of the raw materials used and mixing operation, upon the viscosity increasing velocity of the mixing of the resin and the metal alkoxide was extremely remarkable and so the control of the viscosity was difficult.

In some case, the viscosity of the mixture of the resin and the metal alkoxide became too high to use, during the mixing.

In some case, the viscosity increased gradually while the reinforcing materials being impregnated with the mixture.

In some cases, the viscosity of the mixture did not rise even when heated.

The object of the present invention is to improve the disadvantage of the metal alkoxide method. The present inventors have executed numerous experiments and studies for many years and found that the viscosity can be controlled freely under hte following conditions. Thus, the metal alkoxide method has become industrially available.

In the following, the method of this invention will be described in detail:

The most suitable resins for carrying out the present invention are polyester resins.

Polyester resins available for fiber reinforced plastics are unsaturated polyester resins. (Refer to page 29 of Fiber Glass Reinforced Plastics by Ralph G. H. Dietz. Sc. D. Published by Reinhold Publishing Corp., New York.)

The term "unsaturated polyester resin" (hereinafter simply designated as polyester resin) applies to resins produced by the condensation of ethylenically unsaturated dibasic acids with polyhydric alcohols or from derivatives of these materials.

Commercial polyester resins of the above type are generally supplied as solutions in reactive monomers such as styrene.

A typical poly-esterification reaction may be represented as follows:

$$HO.R.OH + HOOC.R^1.COOH \rightarrow$$
$$\rightarrow HO.R.O.OC.R^1.COOH + H_2O$$

$$HO.R.O.OCR^1COOH + HO.R.OH \rightarrow$$
$$\rightarrow HO.ROOCR^1COOR.OH + H_2O$$

The reaction can proceed further with acid and glycol to give a long chain linear polyester:

$$HOROOCR^1COOROOC.R^1.COOR.OOCR^1$$
$$COOROOC.R^1.C \ldots \text{etc.}$$

where HO.R.OH is a glycol, and HOOC.R¹.COOH a dibasic acid.

If ethylene glycol and maleic acid are taken as examples, a linear polyester chain may be built up containing unsaturation at each maleic acid residue in the chain, which may be represented as follows:

$$HOCH_3CH_2OOC.CH=CH.COOCH_2CH_2$$
$$OOC.CH=CH.COOCH_2.CH. \text{etc.}$$

Reaction of such a resin with a monomer like styrene occurs at the reactive double bonds and may be depicted as follows:

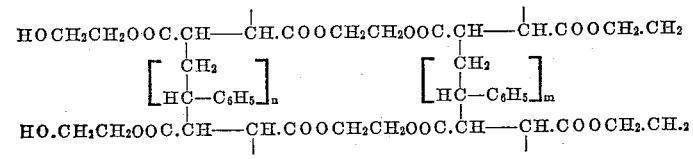

Unsaturated dibasic acid usually used to prepare polyesters is fumaric acid or maleic anhydride.

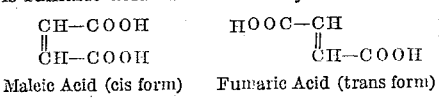

Maleic Acid (cis form)  Fumaric Acid (trans form)

Acids such as itaconic, mesaconic and citraconic may be employed but they are more expensive and have no technical advantage over the first two acids mentioned.

Many glycols may be used to prepare polyesters but those which, for commercial and technical reasons, are most generally employed include ethylene, diethylene, propylene, dipropylene and butylene glycols. The choice of glycol influences the properties of both the uncured and the cured resin. It is probable that 1·2 propylene glycol is the most widely used glycol.

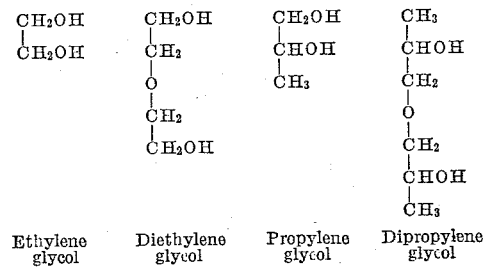

Ethylene glycol    Diethylene glycol    Propylene glycol    Dipropylene glycol

Other diols in use include those based on ethylene and propylene oxide condensates with dihydric phenols such as diphenylol propane which may be represented as follows:

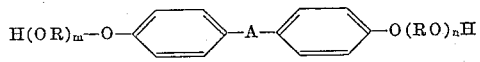

These diols can be used to produce solid polyester resins which have sufficiently high softening points to enable them to be ground to stable powders.

The resins obtained by condensing maleic or fumaric acid with aliphatic glycols are not suitable for laminating since they are not readily soluble in styrene. In order to achieve this solubility, the resin formulation is modified by replacing part of the ethylenically unsaturated acid (i.e. maleic or fumaric acid) with saturated dibasic acids. Other properties of the cured resin, such as heat and flame resistance and flexibility, may be controlled in the same manner and a brief description of the role of some acids in polyester resin manufacture follows.

(1) *Phthalic anhydride*

Phthalic anhydride is widely used as the modifying acid in general purpose resins. Its inclusion confers on the resin good solubility in styrene monomer, whilst at the same time reducing the amount of ethylenic unsaturation in the polymer chain. It has some disadvantages from the resin manufacturer's point of view since it sublimes easily during processing of the resin.

(2) *Sebacic and adipic acids*

Sebacic and adipic acids replacing part of the unsaturated acid give rise to more flexible resins.

(3) *Isophthalic acid*

Isophthalic acid, although more difficult to esterify than phthalic acid, has been claimed to give rise to superior products.

Owing to the high melting point (350° C.) and the low solubility of isophthalic acid, polyester resins incorporating this acid need to be refluxed in the initial condensation stage, before proceeding with distillation.

Isophthalic acid is obtained by oxidation of m-xylene, one of the most abundant of the xylene isomers:

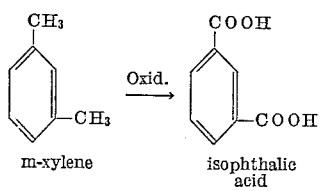

(4) *Isosebacic acid*

In place of the well known, but comparatively expensive, sebacic acid, another material of interest is now being made by the U.S. Industrial Chemical Co. It is a mixture of $C_{10}$ dicarboxylic acids with an approximate composition of: α-ethyl suberic acid (72–80 percent); α,α-diethyl adipic acid (12–18 percent); sebacic acid (6–10 percent).

Sebacic acid is obtained commercially from castor oil, whilst "isosebacic acid" is synthesized from butadiene and promises to be considerably cheaper than the former.

Also polyester resin denatured or modified by acrylic resin (polymer of acrylic acid, methacrylic acid or their derivatives) can be used. The polyester resin referred to in the present invention includes also such denatured polyester resin. The ratio of polyester resin and acrylic resin is desired to be more than 1 and preferable more than 2.

Chelated aluminum di-alkoxide having the general formula

gives the best result among metal alkoxide, wherein R is lower alkyl radical such as methyl, ethyl, propyl, isopropyl, butyl and isobutyl and acyl is acyl radical selected from the group consisting of (a)    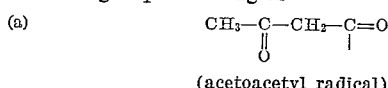

(acetoacetyl radical)

(b)    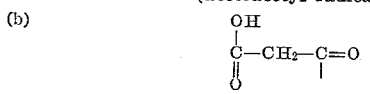

(mono malonyl radical)

and (c)    

($R^1$ is lower alkyl radical as mentioned above)

These chelated aluminum alkoxide (hereinafter simply designated as aluminum alkoxide) are mixed with the resin mixture.

The proportion of metal alkoxide to resin is varied depending upon the kinds of metal alkoxide and resin and the viscosity to be imparted to preimpregnated or prepreg formable materials. It is appropriate to use such amount as from 2 to 10% of metal alkoxide based on the weight of the resin mixture, namely the total weight of curing agent, catalyst, accelerator, inhibitor and the unsaturated polyester resin (resin mixture). When the weight of metal alkoxide is less than 2%, a preimpregnated formable material of sufficiently high viscosity can not be obtained, and when the amount of metal alkoxide exceeds 10%, the viscosity of the resin mixture increases during the mixing.

The mixture of metal alkoxide with resin can be used to impregnate into the reinforcing material and then its viscosity is raised to obtain prepreg. Or, without impregnating reinforcing material with said mixture, its viscosity can also be raised to obtain prepreg. In this case, fillers, such as calcium carbonate, glass powder, mica powder may be mixed with the resins.

Furthermore, a curing agent, accelerator, inhibitor, catalyst, or color agent or the like may be added. The order of mixing is not critical. Resins, metal alkoxide and these materials may be mixed simultaneously, or these materials may be mixed with the mixture of metal alkoxide and resin. Further, these materials may be added to either one or both of resin and metal alkoxide before the resin and the metal alkoxide is mixed.

The viscosity-increasing velocity of the mixture comprising metal alkoxide and resin has a close relationship with the amount of water included in said mixture. Generally, the larger the amount of water, the greater is the viscosity-increasing velocity. However, this is not always true. Even when a large amount of water is present in the mixture, the viscosity-increasing velocity is not always great, and in some cases, the viscosity-increasing velocity is remarkably small. We have found the following as the result of our investigations:

There are two sorts of water contained in the mixture. Water in a certain state reacts with the metal alkoxide and increases the viscosity of the resin mixture. The water in such a state is designated as free water or water in the free state. Water included in resin, metal alkoxide, curing agent, accelerator, inhibitor, catalyst and reinforcing material such as glass fiber, rock wool, asbestos, natural fiber and synthetic fiber and filler, such as glass powder, calcium carbonate and mica powder and water attached to water-supplying agents (which will be explained later) are free state water.

On the contrary, water in a certain state has no viscosity-increasing ability. The water in such a state is called water in the restricted state or restricted water. The typical example of the restricted water is water of crystallization. With respect to the restricted water, a further detailed description will be given later.

The larger the amount of free water contained in the mixture, the more rapidly is viscosity increases.

When the amount of free water is less than 0.75 mol per 1 mol of metal alkoxide, the viscosity-increasing velocity is considerably low, even if large amount of restricted water is contained. When free water is less than 0.5 mol per mol of metal alkoxide, the viscosity will hardly be increased.

On the contrary, when the amount of free water is more than 0.75 mol per 1 mol of metal alkoxide, the viscosity-increasing velocity is considerably high. When the amount of free water is more than 1 mol per 1 mol of metal alkoxide, the viscosity-increasing velocity is remarkably high.

However, when the amount of free water exceeds 4 mols per 1 mol of metal alkoxide, it becomes difficult to obtain prepreg formable material of high viscosity. When free water is from 1 to 3 moles per 1 mol of metal alkoxide, the most appropriate result may be expected. Thus, the amount of free water contained in the mixture is kept less than 0.75 mol and preferably less than 0.5 mol per 1 mol of metal alkoxide, until the reinforcing materials are impregnated with the mixture or during its manufacture or storage. After the impregnation, free water is increased to the amount ranging from 0.75 mol to 4 mols, preferably from 1 to 3 mols per 1 mol of metal alkoxide, and thus, homogeneous prepreg formable materials of constant grade are readily obtained.

As will be mentioned in the following, there are various methods to maintain the amount of free water (including free water supplied from free water-supplying material) in the above-mentioned range.

Most valuable method of them is a method, in which free water-supplying material is used.

When the reinforcing material is in fibrous and thick, rolled or folded state, the method, in which free water supplying material is used, is especially effective.

This process is based on the following findings.

A certain kind of restricted water is converted into free water by heating.

The viscosity of the resin mixture is raised by the water thus converted into free state and the viscosity thus increased will not decrease even if it is cooled again.

The present invention has become extremely valuable on account of the above-mentioned findings.

The temperature at which restricted water is converted into free water (hereinafter referred to as transition temperature of water) lies in a wide range as apparent from the following example.

As described above, a typical example of water converted from restricted state into free state at a fixed temperature is water of crystallization. In this case, the transition temperature of water is the temperature at which the crystal converts to a state having less water of crystallization.

Substances, such as crystals with water of crystallization, which supply free water by heating are designated as free water-supplying material, and the temperature at which free water is released, is designated as free water releasing temperature (this temperature being equal to the transition temperature water). Substances which release free water as a result of decomposition by heating, such as chloral hydrate can be used also as free water-supplying material. In this case, the free water releasing temperature or transition temperature of water is the decomposition temperature.

Substance containing adsorption water, such as silica-gel and zeolite can also be used is a free water-supplying material, in which case the transition temperature of water is the temperature of releasing the adsorption water. However, these substances are not so effective as crystals with water of crystallization or as materials which release free water as a result of decomposition.

In order to manufacture prepreg formable materials by using free water-supplying materials, the following methods can be used.

Metal alkoxide and a free water-supplying material are mixed in pulverized form or in a solution with resin. A curing agent, accelerator, inhibitor, catalyst, coloring agent, filler and the like may be added, if necessary.

The mixture thus obtained is required not to include more than 0.75 mol of free water per 1 mol of metal alkoxide, preferably not to include free water more than 0.5 mol per 1 mol of metal alkoxide. For this purpose, the constituents of the mixture should in advance be dried, or the mixing operation should be performed in a dried atmosphere, if necessary.

The amount of free water-supplying material used is determined such that the total amount of the free water released from the free water-supplying material and the free water included in the mixture from the beginning shall be from 0.75 mol to 4 mols, preferably from 1 mol to 3 mols per 1 mol of metal alkoxide.

The viscosity of the mixture having the abovementioned composition does hardly rise if the mixture is kept below the free water releasing temperature or the transition temperature of water, but the viscosity increases rapidly if the mixture is heated above said temperature. The transition temperature of water should be higher as compared with the temperature at which the resin is mixed, the mixture is stored, or reinforcing material is impregnated therewith, and the transition temperature of water should be lower than the curing temperature of the resin, when such free water-supplying material is used, it will be obvious that prepreg formable material of homogeneous quality can be obtained.

For instance, when polyester resin is used and methyl ethyl ketone peroxide is used as a catalyst (the curing temperature of the above-mentioned resin is about 80° C.), crystals with water of crystallization, such as alum (64.5° C.), sodium bromide (51.0° C.), sodium borate (60.0° C.), sodium sulfate (32.4° C.), cadmium bromide (36.0° C.) and the like can be used. In the above description, numerals in bracket designate free water-releasing temperatures.

In the case of curing temperature being higher, zinc acetate (100° C.), sodium acetate (100° C.) and oxalic acid (100° C.), chloral hydrate (96° C.), silica-gel (80 to 100° C.) and zeolite (from 80 to 100° C.) can be used as well as the crystals above-mentioned.

As a method for supplying free water to the mixture containing resin and metal alkoxide, there are many methods such as described later, among which the method of using free water-supplying material is the most preferable.

In particular, when reinforcing material is in fibrous and thick, rolled or folded state, extremely good result can be obtained by using this method.

As described above, it was not possible to obtain homogeneous prepreg formable material by using thick, rolled or folded reinforcing fibrous material. For instance, in order to impregnate rolled rovings homogeneously with resin and to obtain prepreg formable material, it is necessary to unwind the rovings. Accordingly, the usual method requires long and big equipments.

For instance, a glass fiber roving, of outer diameter 12.5 cm., inner diameter 6 cm., height 25 cm., wound in cylindrical form, has a length of approximately 1,000 m. when unwound. If this roving is continuously unwound and the unwinding velocity is 1 m./sec. and if it takes 10 min. to impregnate the roving with the resin and to raise the viscosity of the resin, the equipment of 600 m. length shall be required.

On the contrary, the method of the present invention has no such disadvantages.

As the viscosity of the mixture comprising resin, metal alkoxide and free water-supplying material remains low and constant, only a short time is required for the mixture to penetrate even into thick, rolled or folded fibrous material, and homogeneous preg formable material can be easily obtained by heating.

According to the process of the present invention, long and rolled prepreg materials can be obtained without unwinding process and so no long equipment is needed.

In order to obtain prepreg material from reinforcing fibrous material of above-mentioned form, the following method is suitable. The reinforcing fibrous material is put into a vessel, and the vessel is then closed and exhausted approximately to 10 mm. Hg. A mixture containing resin, metal alkoxide and free water-supplying material is poured into the vessel.

The time required for the reinforcing fibrous materials to be impregnated with the mixture is generally from 10 to 30 minutes.

The ratio of the resin and the reinforcing fibrous material in the prepreg formable material can be controlled by the space ratio of the fibrous material. For instance, prepreg formable materials having resin content (by weight) of 40%, 32% and 22% respectively can be obtained by using rolled glass fiber having space ratio of 66.2%, 53% and 40%.

This invention is further described in the following examples which are illustrative but not limitative.

*Example 1*

100 parts of unsaturated polyester resin (65% styrene solution of the resin obtained by heating 310 parts of ethylene glycol, 450 parts of propylene glycol, 190 parts of maleic acid and 740 parts of phthalic anhydride at 200–210° C. for 2 hours in an atmosphere of $CO_2$), 4 parts of 70% styrene solution of (ethyl malonate)-aluminum dibutoxide, 1 part of di-cumyl peroxide were mixed in a dry atmosphere and the mixture thus obtained, containing 0.3 mol of free water per 1 mol of (ethyl malonate)-aluminum dibutoxide was obtained.

The viscosity of the mixture directly after the mixing was 1,100 cp., and after one month's storage at room temperature, substantially no increase of the viscosity was found.

50 parts of glass fiber cloth containing 0.5% of free water were impregnated with 50 parts of the above-mentioned mixture, heated at 70° C. for 2 to 10 min. and thus, tack free prepreg formable material was obtained. The amount of free water supplied from glass fiber cloth was 2.5 mols per 1 mol of (ethyl malonate)-aluminum dibutoxide.

*Example 2*

100 parts of unsaturated polyester resin shown in Example 1, 6 parts of 70% styrene solution of (acetoacetylate)-aluminum di-i-propoxide, 1 part of di-t-butyl peroxide and 8 parts of chloral hydrate were mixed together and the mixture thus obtained, containing 0.2 mol of free water per 1 mol of (acetoacetylate)-aluminum di-i-propoxide was obtained. The viscosity of the mixture directly after the mixing was 3,000 cp. After 24 hrs. storage at room temperature, no increase of the viscosity was found. The mixture was heated at 96° C. for 2 to 10 min. Then, non-tacky gel-form substance was obtained.

The temperature at which chloral hydrate releases free water was 96° C., and the amount of free water released from chloral hydrate was 0.8 mol per 1 mol of metal alkoxide.

*Example 3*

100 parts of unsaturated polyester resin, shown in Example 1, 4 parts of 70% styrene solution of (ethyl malonate)-aluminum dibutoxide and 1 part of dicumyl peroxide were mixed in a dry atmosphere. 100 parts of the mixture thus obtained was mixed respectively with 0.3 part, 0.4 part and 0.7 part of alum. Further, in order to obtain non-tacky gel-form substance by heating at 70° C., each mixture took 25 min., 15 min. and 14 min. respectively.

Free water released from alum were respectively 0.5 mol, 0.7 mol and 1 mol per 1 mol of (ethyl malonate)-aluminum di-butoxide.

*Example 4*

Glass fiber roving wound in the cylindrical form of 6 cm. inner diameter, 12 cm. outer diameter, 25 cm. height and with free space content of 50% was set in a closed vessel. The pressure in the vessel was reduced to 10 mm. Hg and thereafter, 100 parts of the mixture described in Example 3 and 0.3 part of fine powder of alum (200 Tyler mesh) were poured therein. The roving was taken out after 10 min., heated at 70° C. by high frequency energy, and thus, homogeneous prepreg form formable material of glass content of 70% was obtained.

*Example 5*

50 parts of acrylic resin (a mixture of 35 parts of methyl methacrylate monomer and 15 parts of methyl methacrylate polymer, mean molecular weight of the polymer being about 2,200, and the viscosity of the mixture being 600 cp. at 20° C., and specific gravity of the mixture ($d_4^{20}$) 1.015), 100 parts of unsaturated polyester resin as described in Example 1, 1.5 parts of benzoyl peroxide, 4 parts of (ethyl malonate) aluminum dibutoxide and 0.3 part of alum were mixed together and the mixture thus obtained containing 0.5 mol of free water per 1 mol of (ethyl monomalonate)-aluminum di-butoxide was produced. The viscosity of the mixture showed substantially no increase at room temperature and of non-tacky gel-form substance could be obtained by heating at 70° C. for 2 to 10 minutes. Free water released from alum was 0.5 mol per 1 mol of (ethyl malonate)-aluminum dibutoxide.

What we claim is:

1. A method for the production of formable resin materials which comprises mixing unsaturated polyester resin with an aluminum alkoxide compound capable of increasing the viscosity of said resin selected from the group consisting of (a) 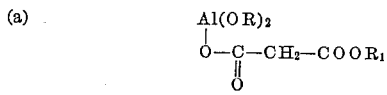

and (b) 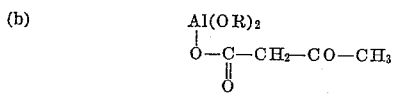

wherein R is lower alkyl and $R_1$ is selected from the group consisting of hydrogen and lower alkyl and, as a free water supplying material, a material containing restricted water at the mixing temperature but capable of yielding free water upon heating; maintaining the free water content of said mixture during the mixing below 0.75 mol per mol of said aluminum alkoxide compound and then heating the mixture to release free water from the restricted water containing material to raise the viscosity of the mixture, the quantity of said material capable of yielding free water being such that the free water released thereby during heating of the mixture is sufficient to provide a total free water content in said mixture between above 0.75 to about 4.0 mol per mol of said aluminum alkoxide compound.

2. A method as defined in claim 1 in which the free water content of the mixture during the mixing is kept below 0.5 mol per mol of aluminum alkoxide compound and the quantity of said material capable of yielding free water being such that the water released thereby during said heating of the mixture is such as to provide a total free water content in said mixture between 1 and 3 mols per mol of said aluminum alkoxide compound.

3. A method as defined in claim 1 wherein said material capable of yielding free water is a compound containing water of crystallization.

4. A method as defined in claim 1 wherein said material capable of yielding free water is chloral hydrate.

5. A method as defined in claim 1 comprising in addition impregnating reinforcing fibrous materials with the mixture before it is heated to raise its viscosity and then heating the impregnated reinforcing materials to increase its viscosity.

6. A method as defined in claim 5 in which the reinforcing fibrous materials are wound.

7. A method as defined in claim 5 in which the reinforcing fibrous materials are rolled.

References Cited

UNITED STATES PATENTS 2,767,158 10/1956 Schlenker et al. _____ 260—37
2,911,316 11/1959 Rinse _____ 260—37
3,218,273 11/1965 Montesano _____ 260—37

MURRAY TILLMAN, *Primary Examiner.*

W. J. BRIGGS, *Assistant Examiner.*